3,076,260
STRIP AND METHOD FOR MANUFACTURING BUNDY TUBING AND METHOD OF MAKING THE SAME
Edward J. Roehl, Warren, Ohio, assignor to Pittsburgh Steel Company, Pittsburgh, Pa., a corporation of Pennsylvania
No Drawing. Filed Jan. 20, 1959, Ser. No. 787,808
5 Claims. (Cl. 29—476.5)

This invention relates generally to copper-plated steel which is to be subjected to a brazing operation, but has reference more particularly to copper-plated steel strip used in the manufacture of brazed steel tubing, but more specifically tubing known in the trade as Bundy tubing.

Bundy tubing and the method of manufacturing such tubing is described in United States Patent Nos. 1,892,607; 1,930,191; 1,949,623 and 2,092,557, to which reference may be had for a better understanding of the background for this invention.

In the commercial manufacture of Bundy tubing, cold rolled low carbon steel strip is employed, the strip being electroplated on both sides with copper, and then annealed to develop the desired physical properties for forming it in the tube forming machinery, as described in the aforesaid patents. The effects of the annealing step on the copper coated steel is described in Patent No. 1,949,623.

The tube manufacturing process consists in forming the copper-plated steel strip around a mandrel, with a slight draw to insure good physical contact of the plated surfaces with each other, which surfaces are then welded or brazed together by heating the formed tubing in a brazing furnace containing an inert atmosphere, at temperatures slightly above the melting point of copper, for a short but fixed interval of time, followed by cooling of the brazed tubing, as described more particularly in Patent No. 2,092,557. In actual manufacturing, these operations or steps are performed as rapidly as possible, and the copper-plated steel must be uniform and practically perfect in chemical and physical properties in order to produce consistently perfectly brazed tubing under commercial operating conditions.

The process thus depends for its successful operation on a very rapid brazing together of the adjacent steel surfaces of the tubing by the molten copper between them which in turn requires very rapid alloying of the steel with the molten copper. Anything which interferes with this action will prevent complete and uniform bonding of the surfaces, and thus result in the production of defective tubing. The defects are evinced by areas of steel not wetted by the molten copper, and show up in the finished product as leaky tubing, particularly along the seams.

The production of defective tubing, due to incomplete or imperfect brazing, has been attributed to numerous factors, which are usually related to differences in the chemical and/or physical properties and condition of the steel surfaces under the copper plate, but none of these factors have been clearly and specifically defined or well understood.

Although various means have been proposed for overcoming some specific difficulties, it has been found to be virtually impossible under commercial manufacturing conditions to produce continuously and consistently a copper-plated steel strip which could be depended upon to make perfect tubing uniformly and tightly brazed at all times under the conditions encountered in the commercial manufacture of Bundy tubing as specified in the aforesaid patents.

The present invention has as its primary object the manufacture commercially of copper-plated steel strip for the manufacture of Bundy tubing as described in the aforesaid patents, which strip will consistently produce uniformly welded or brazed tubing under commercial operating conditions of tube manufacture.

Another object of the invention is to provide strip of the character described, having the properties necessary to produce uniformly welded tubing under such commercial operating conditions of tube manufacture.

A further object of the invention is to provide Bundy tubing which is free from the defects which have been described in connection hereinabove.

Other objects and advantages of the invention will become apparent in the course of the following description of the invention.

The aforesaid objectives are accomplished by first applying to the cleaned steel surfaces of the strip a thin plating of nickel and then applying to the strip, over the thin nickel plating a conventional plating of copper, the plating, in each instance, being performed by an electroplating process.

It has been found that the presence of a thin nickel plating between the steel and copper eliminates the erratic results which have been described above, and obtained by using plain copper-plated steel in the commercial manufacture of Bundy tubing, and, at the same time, assures the continuous commercial production of a uniformly and perfectly bonded product.

The essential requirement for the nickel plating, with respect to thickness, is that its thickness must be sufficient so that not all of it is diffused into the steel and copper during the brazing operation, and the prior anneal, if used, since a definite nickel layer must remain between the copper and steel, and a definite outer layer of copper must be present to effect proper bonding in the brazing operation. Thus the nickel plate must be present as a distinct entity for the successful operation of the process, and a copper-nickel alloy plate is by no means equivalent to the separate nickel and copper plates, although, of course, some alloying takes place at the interfaces between these plates during the brazing operation.

The maximum thickness of the nickel plating, on the other hand, is governed by considerations of economy, since there is no technical advantage to be gained by the use of an excessively thick nickel plating. The maximum thickness of the nickel plating is also dictated by the physical requirements of the composite strip for use in the tube forming machinery.

In practice, it has been found that the thickness of the nickel plating should not be less than about 0.000035 inch, but should not exceed about half the thickness of the copper plating, or about 0.000075 inch. For the reasons already stated, it is desirable to stay as closely as possible to the aforesaid minimum thickness, which may therefore be considered as the preferred or optimum thickness of nickel plating.

The nickel and copper coatings may be deposited on cold-rolled steel strip in the hardened condition, followed by annealing, or the annealing of the strip may be done first, and the strip thus plated in the soft condition. If the hard steel is plated and then annealed, some interdiffusion of nickel and steel, and also of nickel and copper, takes place, so that the nickel plating must be thick enough to supply nickel for this diffusion, while still leaving a definite layer of unalloyed nickel between the diffused interfaces. This minimum thickness, as already stated, has been found to be about 0.000035 inch.

As an illustrative example of the invention, cold rolled low carbon strip steel may be employed, both surfaces of which are coated with two layers of electrodeposited metal, the first being a plating of nickel having a carefully controlled thickness of between 0.00003 and 0.00004 inch, preferably about 0.000035 inch, covered with electrodeposited copper of a thickness between 0.0001 and 0.0002 inch, preferably about 0.00015 inch.

Such a product can be made from cold rolled low carbon strip steel in coil form. The strip is first cleaned and pickled in conventional baths, by methods well known in the art, to thereby provide clean surfaces on the strip suitable for the reception of an adherent nickel plating. Nickel is then electrodeposited on each surface of the steel strip to a controlled thickness of between 0.00003 inch and 0.00004 inch, preferably about 0.000035 inch, by passing the strip continuously through a conventional nickel plating bath of the well-known Watts type formulation, at a temperature of about 140° F. and plating at a current density suitable to the bath formulation used, generally about 40 amperes per square foot. By controlling the speed at which the strip is passed through the plating bath and the current density at which the nickel is plated, the thickness of the nickel plating can be controlled accurately.

The strip is then passed through water rinses and then through an acid copper plating bath of conventional formulation, in which it is plated with copper to a specified thickness, usually about 0.00015 inch, required for the brazing operation. The strip is then washed, dried and coiled.

If the strip has been plated in the roll-hardened condition, it can then be annealed to produce specified physical properties, or the strip can first be annealed, then plated in the soft condition. In either case, the presence of the nickel plating between the steel surface and the copper plating insures uniformly successful results in the manufacture of Bundy tubing from the strip, on a commercial scale.

It is thus seen that I have provided a copper-plated steel strip which will consistently produce uniformly welded or brazed Bundy tubing under commercial operating conditions, and which tubing is free from the defects which have heretofore been characteristic of such manufacture.

Although the invention has been described particularly with reference to application of the nickel and copper by electroplating, it is to be understood that these coatings may be applied by other methods currently used for the application of metal coatings, such, for example, as cladding, spraying, vapor deposition and chemical reduction or "electroless" plating.

It will be understood that slight changes may be made in the product and method, as described, without departing from the spirit of the invention or the scope of the appended claims.

Having thus described my invention, I claim:

1. The composite strip for manufacture into Bundy tubing and the like, said strip comprising a steel base, a nickel plating on each surface of said steel base having a thickness of from about 0.000035 to about 0.000075 inch, and a copper plating over each of said nickel platings, said copper platings having a thickness of from about 0.0001 to about 0.0002 inch.

2. A composite strip, as defined in claim 1, in which the nickel plating has a thickness of about 0.000035 inch, and the copper plating has a thickness of about 0.00015 inch.

3. The method of manufacturing brazed tubing, which comprises electroplating a steel strip on both surfaces with platings of nickel to a thickness of from about 0.000035 to about 0.000075 inch, then applying platings of copper over the nickel platings to a thickness of from about 0.0001 to about 0.0002 inch, then forming the strip into multi-ply tubing, in which the copper platings of the plies are in substantial contiguity with each other, and then heating the formed tubing to a temperature at which the copper surfaces are brazed to each other.

4. The method as recited in claim 3, in which the nickel platings are of a thickness of about 0.000035 inch, and the copper platings are of a thickness of about 0.00015 inch.

5. The method, as recited in claim 3, in which a definite layer of unalloyed nickel is maintained between the copper and steel throughout the process.

References Cited in the file of this patent

UNITED STATES PATENTS

| | | |
|---|---|---|
| 376,681 | Root | Jan. 17, 1888 |
| 1,739,757 | Hood | Dec. 17, 1929 |
| 1,841,300 | Scarritt | Jan. 12, 1932 |
| 1,892,607 | Bundy | Dec. 27, 1932 |
| 1,949,623 | Quarnstrom | Mar. 6, 1934 |
| 2,092,557 | Quarnstrom | Sept. 7, 1937 |
| 2,316,349 | McMinn | Apr. 13, 1943 |
| 2,539,247 | Hensel | Jan. 23, 1951 |
| 2,748,067 | Pease et al. | May 29, 1956 |
| 2,779,999 | Boam et al. | Feb. 5, 1957 |
| 2,878,172 | Scavullo | Mar. 17, 1959 |
| 2,942,999 | Roehl et al. | June 28, 1960 |

FOREIGN PATENTS

| | | |
|---|---|---|
| 454,415 | Great Britain | Sept. 30, 1936 |
| 520,365 | Great Britain | Apr. 22, 1940 |